No. 615,774. Patented Dec. 13, 1898.
J. W. ZIMMERMAN.
FAUCET FOR DRAWING BEER, &c.
(Application filed Oct. 19, 1897.)

(No Model.)

Witnesses.
Edward J. Louther
Richard H. Adair.

Inventor.
John W<sup>m</sup> Zimmerman

UNITED STATES PATENT OFFICE.

JOHN WM. ZIMMERMAN, OF CANTON, OHIO.

FAUCET FOR DRAWING BEER, &c.

SPECIFICATION forming part of Letters Patent No. 615,774, dated December 13, 1898.

Application filed October 19, 1897. Serial No. 655,739. (No model.)

*To all whom it may concern:*

Be it known that I, JOHN WM. ZIMMERMAN, a citizen of the United States, residing at Canton, in the county of Stark and State of Ohio, have invented certain new and useful Improvements in Faucets for Drawing Beer and other Liquids and Preventing all Dripping of Liquids, of which the following is a specification.

My invention relates to improvements in faucets for drawing beer and other liquids, and has for one of its objects to furnish a simple faucet which may be attached to one of the existing faucets or directly to the pipe conveying the liquid by means of a screw-clamp on the end of said faucet.

Another object of my invention is to provide a faucet which may be opened by a simple upward pressure which can be readily applied though both hands be full and which will close itself automatically as soon as such upward pressure is removed.

Another object of my invention is to provide a much cheaper and simpler faucet than even the ordinary common stop-cock faucet and at the same time one that will not leak and has no parts to wear out or become loose by friction.

Another object of my invention is to provide a faucet which when attached to ordinary faucets will permit the stop-cock of such faucets to be left open all the time unless it be desired to have double security against leakage, in which case when the day's work is done and the place is to be closed for the night the stop-cock can be turned off, thus preventing almost entirely any wear of the faucet or stop-cock.

Another object of my invention is to provide a faucet that is more easily and quickly opened or shut than the existing faucets and more speedy in its operations than they and one that will entirely prevent dripping.

Another object of my invention is to provide a faucet which can be opened wide instantly, diminishing thereby the tendency of beer and like fermented liquors to "draw wild" or foam, and which closes as quickly.

These objects I accomplish in the manner and by the means hereinafter more fully described in detail, and particularly pointed out in the claims, reference being had to the accompanying drawings, in which the same reference-letters indicate like parts in all the figures.

Figure 1:
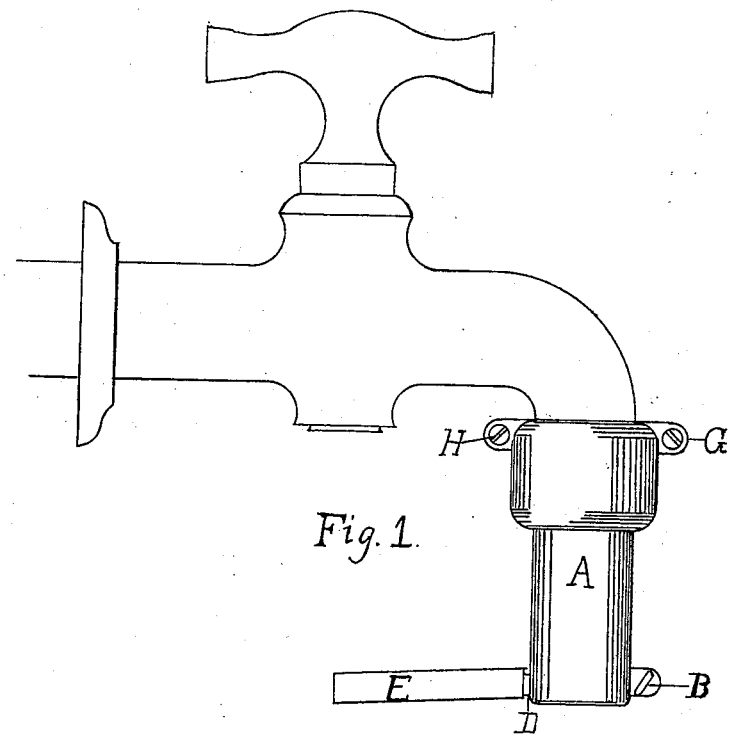
Figures 2, 3:
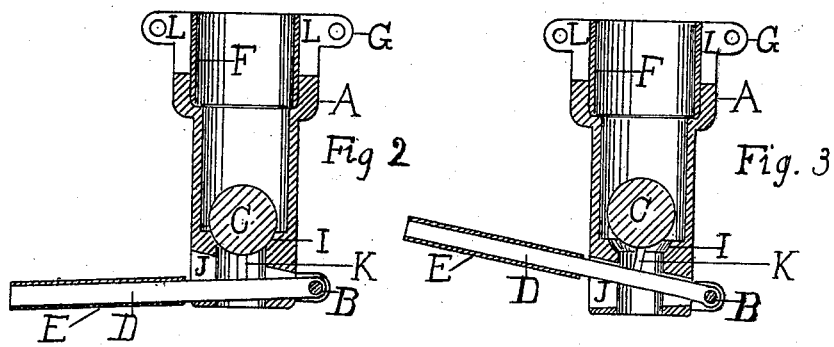

Figure 1 is a view of my invention in an operative position. Fig. 2 is a vertical sectional view through the center of my invention, showing the ball-valve closed. Fig. 3 is the same showing the valve open.

My invention consists of a hollow cylindrical tube A, the exterior circumference of the upper end of which being enlarged to prevent impairment of the strength of that part of the tube A by enlarging the interior of said tube A at that end to allow the insertion therein of a rubber sleeve and the end of a faucet or pipe. From the top said tube A is split on opposite sides for a short distance, and from either side of each of these splits L L lugs G G G G extend outwardly from said tube A. Said lugs G G G G are pierced by holes interiorly screw-threaded, in which holes the screws H H work. A rubber sleeve F fits in the enlarged part of said tube A and rests on the shoulder formed by said enlargement. The diameter of the interior of said tube A toward its lower end is reduced to form a circular seat I, into which the ball C fits exactly, forming a ball-valve, and from said seat I to the lower end of said tube A the bore of said tube A continues of greatly-reduced diameter. From near the lower end of said tube A a longitudinal slot J extends upward, the upper face of said slot J slanting downward. From each side of the smaller opening of said slot J said tube A has lugs B B extending outward provided with holes. Through said slot J is inserted a valve-lever D, the end of which lever D passes between said lugs B B and is pivotally secured thereto. From said lever D in the center of the bore of tube A rises at right angles a pin K, which rests against the ball C when said ball C rests upon the valve-seat I. The end of said lever D extends outward from said tube A and is covered with rubber.

The operation of my invention is as follows: The end of the pipe or faucet to which my invention is to be attached is inserted into the top of tube A. The screws H H are screwed up until the end of the pipe or faucet is tightly clamped, the rubber sleeve F forming an elastic cushion and waterproof washer, and then the lever D being raised the pin K raises the ball C and opens the valve, setting the liquid free.

Having thus described my invention, what I claim as new, and desire to secure by Letters Patent, is—

1. A faucet consisting of a straight hollow tube with an enlarged split top and reduced lower end, a ball resting in said tube, a lever extending through the lower part of said tube, its end pivoted thereto, a pin secured to said lever and rising to contact with said ball and means for attaching said tube to a pipe, or faucet, substantially as shown and described.

2. A faucet consisting of a straight hollow tube with an enlarged split top with projecting lugs thereat and reduced lower end, a ball resting in said tube, a lever extending through the lower part of said tube, its end pivoted thereto, a pin secured to said lever and rising to contact with said ball, and screws adapted to engage the lugs and clamp said tube to a pipe or faucet, substantially as shown and described.

3. A faucet consisting of a straight hollow tube with an enlarged split top with projecting lugs thereat and reduced lower end, a ball resting in said tube, a lever extending through the lower part of said tube, its end pivoted thereto, a pin secured to said lever and rising to contact with said ball, a washer fitting in said enlarged upper part of said tube and screws adapted to engage the lugs and clamp said tube to a pipe or faucet, substantially as shown and described.

4. A faucet consisting of a hollow cylindrical tube, having its upper end enlarged exteriorly and interiorly and its interior diameter toward its lower end reduced forming a circular seat from which the bore of said tube extends with reduced diameter, said tube being split from the top a short distance on opposite sides and provided with lugs extending outward from said tube on each side said splits and screw-threaded holes through said lugs in which screws work, a rubber sleeve fitting in said enlarged upper portion of said tube, a ball fitting in said seat and closing said outlet, and a lever passing through a longitudinal slot in the side of said tube near the bottom, said lever provided with a pin which comes in contact with said ball and the arm of said lever extending outside said tube being rubber-covered, and the end of said lever being pivotally secured between two lugs projecting from the face of said tube near the bottom, substantially as shown and described.

In testimony whereof I hereto affix my signature in the presence of two witnesses.

JOHN WM. ZIMMERMAN.

Witnesses:
V. A. DUNBAR,
JOHN V. DUNBAR.